Figure 1:
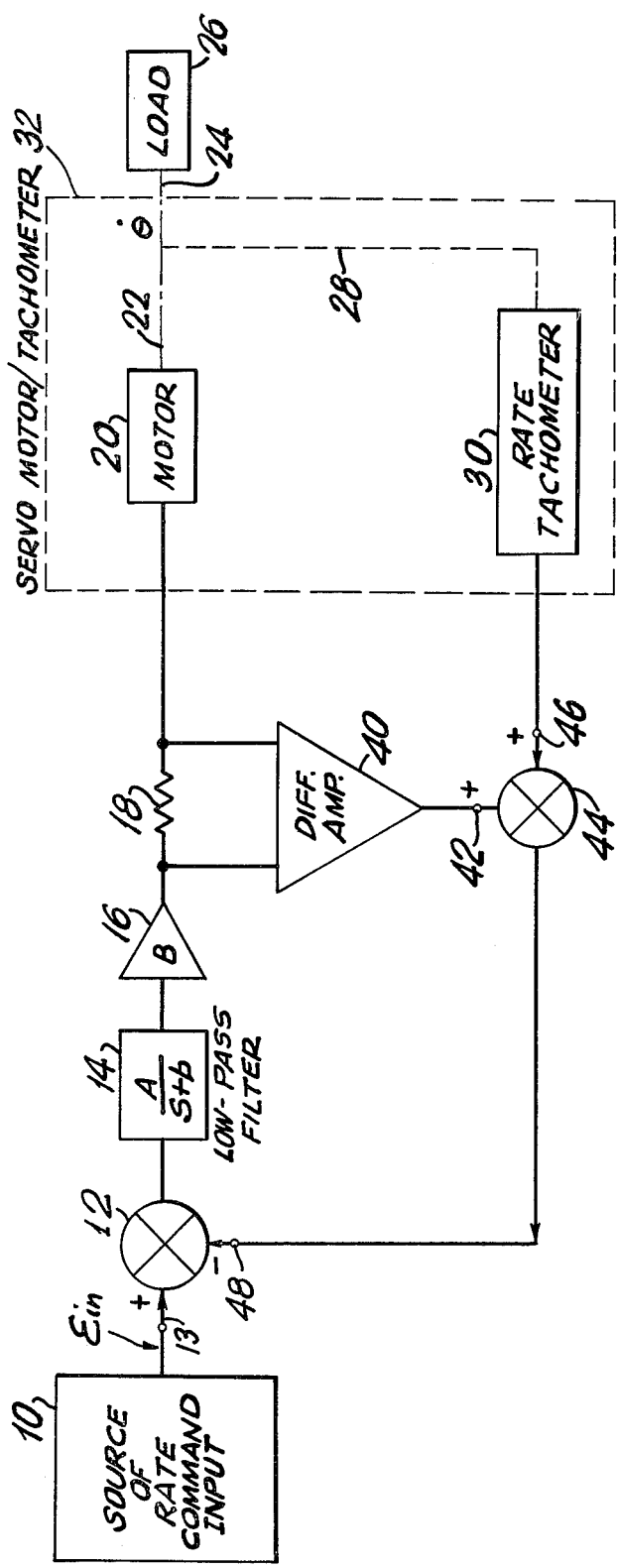

" # United States Patent [19]

Bigley William J. et al.

[11] 4,215,298
[45] Jul. 29, 1980

[54] SERVOMECHANISM RATE CONTROL SYSTEM WITH COMPENSATION FOR MOTOR-TACHOMETER RESONANCE

[75] Inventors: Bigley William J., Scotch Plains; Vincent J. Rizzo, Basking Ridge, both of N.J.

[73] Assignee: Lockheed Electronics Co., Inc., Plainfield, N.J.

[21] Appl. No.: 916,299

[22] Filed: Jun. 16, 1978

Related U.S. Application Data

[63] Continuation-in-part of Ser. No. 866,394, Jan. 6, 1978.

[51] Int. Cl.² .................................................. H02P 5/00
[52] U.S. Cl. .................................... 318/327; 318/618; 318/448
[58] Field of Search ............... 318/326, 327, 328, 618, 318/617, 616, 331, 398, 448

[56] References Cited

U.S. PATENT DOCUMENTS

| | | | |
|---|---|---|---|
| 3,093,776 | 6/1963 | Bird et al. | 318/617 |
| 3,617,844 | 11/1971 | Grygera | 318/331 |
| 3,660,744 | 5/1972 | Plummer | 318/616 |

*Primary Examiner*—David Smith, Jr.
*Attorney, Agent, or Firm*—Hopgood, Calimafde, Kalil, Blaustein & Lieberman

[57] ABSTRACT

A rate-control servomechanism includes a load driving motor and a tachometer mounted on the motor shaft to produce a feedback signal hich corresponds to the rotational speed of the motor. An additional signal corresponding to the motor current is added to the tachometer feedback signal to compensate for the resonance-like effects resulting from the inductive coupling between the motor and tachometer windings.

3 Claims, 2 Drawing Figures

SERVOMECHANISM RATE CONTROL SYSTEM WITH COMPENSATION FOR MOTOR-TACHOMETER RESONANCE

The present application is a continuation-in-part of our application Ser. No. 866,394 filed on Jan. 6, 1978.

The present invention relates generally to load driving systems, and, more specifically, to a servomechanism including means to compensate for the effects of motor-tachometer coupling.

In a typical motor servomechanism arrangement in which a load is to be driven at a rate or speed determined by an input rate control signal, the output speed of the load-driving motor is sensed by a tachometer coupled to the motor shaft. The signal produced by the tachometer is a present shaft speed signal which is fed back to a summing or comparator network, which compares the desired and actual rates of motor operation and produces an appropriate corrective or "error" signal. This "error" signal is appropriately shaped and applied to the drive input of the motor, such that the motor speed effectively and rapidly tracks the rate control signal.

In a prevalently employed motor and tachometer rate control system of this nature, the tachometer winding is mounted adjacent to the motor armature winding. As a result of this proximate positioning of the tachometer and motor windings, electromagnetic and electrostatic coupling is created between the two windings. This coupling (principally inductive) between the motor and tachometer windings produces detrimental effects in the operation of automatic rate control systems. One major source of difficulty introduced by this coupling is that at a certain motor speed, the two windings constitute part of a resonant-like circuit which distorts the speed signal reported by the tachometer winding.

This spurious coupling significantly reduces the performance of the overall control apparatus by reducing the effective bandwidth of the system, thereby also reducing the maximum rate of system operation. To minimize this deleterious interaction between the motor and tachometer windings, attempts have been made to reduce the inductive coupling between these windings, such as by physically separating the motor and tachometer windings and/or providing costly magnetic shielding between the windings.

These proposed solutions, however, add substantially to the cost and/or size of the motor-tachometer assembly and, moreover, still fail to completely overcome the adverse effects of the inductive coupling and resonance created between the windings.

It is therefore an object of the invention to provide improved, low-cost control apparatus.

More specifically, it is an object of the present invention to provide a servomechanism in which the effects of spurious coupling between motor and tachometer windings are substantially eliminated.

It is a further object of the invention to provide in a servomechanism system, a correction for the effects of the inductive coupling between the motor and tachometer windings without adding to either the cost or size of the motor-tachometer assembly; and which can employ existing, uncompensated motor-tachometer units.

To these ends, the rate control system of the present invention introduces an additional feedback signal that is responsive to the current being drawn by the motor. That signal is added to the tachometer or rate signal to compensate for decreases in apparent motor speed produced by the detrimental effects of the coupling between the motor and tachometer windings, such as the establishment of an electrical resonance at a given range of motor driving frequencies.

In an embodiment of the control system described in greater detail below, the motor current is passed through a resistor which develops a voltage proportional to the motor current. This voltage is applied, such as through a differential amplifier, to one summing input of an adder, the other summing input of which is derived from the tachometer. The sum of the tachometer and current corrective signals derived in the adder is applied to the conventional servo loop summer, where it is compared with the rate command signal to produce the error signal.

Figure 2:
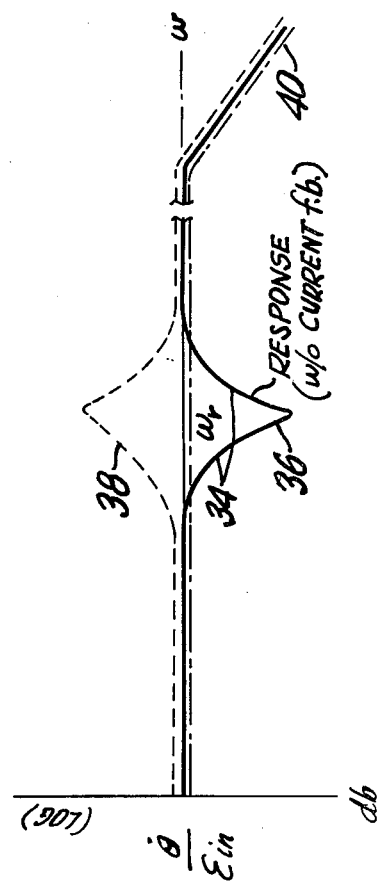

The above and other features and advantages of the present invention will become more clear from the following detailed description of a specific illustrative embodiment thereof, presented in conjunction with the accompanying drawing, in which:

FIG. 1 is a schematic block diagram of a servomechanism rate control system according to an embodiment of the invention; and FIG. 2 shows graphs of system output and motor current as functions of rate illustrating the nature of the problem of resonance solved by the invention, and the manner in which the problem is solved by the present invention.

The servomechanism control system according to an embodiment of the invention shown in FIG. 1 includes a source 10 of an input rate command signal $E_{in}$ which is applied to a summing input 12 of a per se conventional summing or combining circuit (node) 12. The latter receives at its subtracting input 48 a tachometer signal produced in a manner that is described in greater detail below. The output of summing node 12 is applied to the input of a feedback loop frequency shaping network 14, e.g., a low-pass filter which provides a shaping function given by the transform $A/s+b$ to the signal applied at its input.

The output of filter 14 is supplied to a motor driver amplifier 16 having a gain B. The output of the amplifier 16 is applied through a resistor 18, the purpose of which is discussed in greater detail below, to a load-driving motor 20. The motor 20 includes a rotating shaft 22 which rotates at a rotational velocity $\dot{\theta}$ and is coupled through a conventional linkage or gearing indicated at 24 to a load 26—for example, a radar antenna mount or a milling machine whose position and/or velocity are intended to be controlled by the command source 10.

As is conventional, the motor shaft 22 is also mechanically linked as indicated at 28 to a tachometer 30, which is conventionally mounted on the motor shaft in a motor-tachometer assembly indicated at 32. The purpose of the tachometer 30 is to produce an output signal which is proportional to the motor speed.

In a conventional rate control system, the tachometer signal is applied directly to the subtraction input 48 of the summing node 12 which compares the tachometer speed signal to the rate command signal to determine whether the drive motor is properly tracking the input command. That is, the system operates to automatically minimize the difference between the actual and desired rates of the drive motor, thus constraining the output shaft of the motor to follow the value established by the rate command signal, $E_{in}$.

In a conventional motor-tachometer assembly, the tachometer winding is mounted close to the motor armature winding and is typically wound around the armature winding such that inductive (and electrostatic) coupling is present between the two windings. This coupling may produce detrimental results to the control system. One difficulty which occurs as a result of this coupling is illustrated graphically in FIG. 2, which shows the effect of the resonance-like effect above described at a frequency $\omega_r$ on the performance of a rate control system. The curve 36 of FIG. 2 shows the tachometer 30 frequency response for a conventional prior art system. The response 36 includes a frequency zone 34 about the resonance frequency $\omega_r$ where the coupled motor and tachometer windings interfere and resonate. Accordingly, about this frequency zone 34, the tachometer does not accurately report the motor speed.

The consequence of the foregoing is to limit the conventional rate control systems employing a conventional motor—tachometer speed reporting element to driving signal frequencies below the resonance frequency area 34. However, such limited response is not always satisfactory—e.g., in applications in which a high servo speed of response is required. Accordingly, the prior art rate control systems must either employ a more costly tachometer arrangement to minimize or reduce the effects of this resonance, or else they must be operated at a relatively low speed to prevent operation of the load at a frequency at which such resonance occurs.

In accordance with the present invention, the detrimental effects of this resonance are compensated for without modifying the internal arrangement of the motor and tachometer which are often made and sold as an integral assembly. To this end, apparatus is provided to monitor the motor current, and to utilize the increased motor current that occurs at resonance (curve 38 of FIG. 2) to compensate for the effects thereof. As shown in the embodiment of the invention shown in FIG. 1, motor current is sensed by the resistor 18 connected in series between the output of amplifier 16 and the input of motor 20, thus developing a voltage across the resistor 18 which is directly proportional to the motor current.

The terminals of resistor 20 are respectively connected to the inputs of a differential amplifier 40, the output of which is connected to one input 42 of a summer 44. The other input 46 to summer 44 is derived from the output of tachometer 30. The combined output of summing circuit 44 is connected to the subtractive input 48 of node 12.

At operation of the rate control system at rates outside those rates at which tachometer-coupled resonance occurs, the motor current of the instant arrangement (curve 38 of FIG. 2) is relatively quiescent and low such that the voltage developed across resistor 18 and thus the voltage output of amplifier 40 applied to summer 44 is low such that the feedback signal applied to input 48 of node 12 is essentially only that voltage produced by tachometer 30.

As the rate of the system approaches that at which tachometer-coupled resonance begins to occur, the motor current begins to increase to the maximum of curve 38, such that a larger voltage is developed across resistor 18 and is applied to differential amplifier 40. That increased voltage is in turn applied to input 42 of summer 44. The substantially offsetting shapes of the curves 38 and 36 about the resonance zone yield substantially straight line performance characteristic 40 (FIG. 2) at the output of the summer 44. Accordingly, the combined structure 18-32-40-44 accurately reports motor shaft speed—even through the resonance zone. That is, in accordance with the invention, by the proper scaling of such parameters as the resistance of resistor 18, the gain of tachometer 30 and the gain of amplifier 40, the motorcurrent signal added to the tachometer signal at summer 44 is sufficient to compensate for the loss of tachometer output caused by the tachometer-motor winding resonance. By properly scaling the various parameters discussed above, the rate control system of the invention obtains the response curve 40 (FIG. 2) having a linear response well beyond the resonant frequency $\omega_r$ of the tachometer and motor windings, thereby yielding a system that has a broader frequency response and thus effects improved, higher-speed load control.

It is thus apparent that the control system of the invention substantially eliminates the detrimental effects of the electromagnetic coupling between the motor winding and the tachometer winding, without materially increasing the complexity of the system or the cost or size of the motor-tachometer assembly. That is, the improved control system invention permits the use of a low-cost motor and tachometer without the need for shielding or other precautions to reduce coupling.

It will also be apparent that modifications may be made to the embodiment of the invention herein specifically described, all without departing from the spirit and scope of the invention. Thus, for example, the algebraic summation effected by elements 12 and 44 can be accomplished in a single, combined summation device.

What is claimed is:

1. A servo system comprising first summing means comprising a first input receiving a rate control signal, a second input, and an output; a drive motor operatively connected to the output of said first summing means; a tachometer operatively coupled to the drive shaft of said motor and effective to produce a signal corresponding to the rate of rotation of said drive shaft; said tachometer output signal being continuous for all motor conditions; said tachometer and said motor each including winding means having inductive electromagnetic coupling therebetween; means operatively connected between the output of said first summing means and said motor for sensing the current drawn by said motor and for producing a motor drive signal proportional to the motor current, said motor drive signal being continuous for all motor conditions and changing in a direction inverse to the change in said tachometer output signal at resonance for said electromagnetic coupling between said winding means for said motor and said tachometer; and second summing means having a first input operatively connected to said current-sensing means, a second input operatively connected to said tachometer, and an output operatively connected to said second input of said first summing means, said second summing means including means for summing said continuous tachometer and motor drive signals to thereby provide a motor speed signal at said output of said second summing means which is compensated for said electromagnetic resonance.

2. The improvement of claim 1, in which said current-sensing means includes a resistance means connected in the input circuit of the motor.

3. The rate control system of claim 2, further comprising a differential amplifier having inputs connected across said resistance means and an output connected to said first input of said second summing means.

* * * * *